US007523955B2

(12) United States Patent
Blair (10) Patent No.: US 7,523,955 B2
(45) Date of Patent: Apr. 28, 2009

(54) FOLDABLE WAGON

(75) Inventor: Maryann Blair, 7883 S. Open Trail La., Gold Canyon, AZ (US) 85218

(73) Assignee: Maryann Blair, Gold Canyon, AZ (US)

( * ) Notice: Subject to any disclaimer, the term of this patent is extended or adjusted under 35 U.S.C. 154(b) by 101 days.

(21) Appl. No.: 11/787,616

(22) Filed: Apr. 17, 2007

(65) Prior Publication Data

US 2008/0258435 A1 Oct. 23, 2008

(51) Int. Cl.
*B62B 3/00* (2006.01)
(52) U.S. Cl. .................. 280/656; 280/47.34; 280/47.38
(58) Field of Classification Search ................. None
See application file for complete search history.

(56) References Cited

U.S. PATENT DOCUMENTS

| 289,991 | A | * | 12/1883 | Curtis ........................ 24/580.1 |
| 781,243 | A | * | 1/1905 | Thompson .................. 280/651 |
| 1,892,687 | A | * | 1/1933 | Teufel ......................... 211/99 |
| 4,434,961 | A | * | 3/1984 | Hoye ......................... 248/311.2 |
| 5,957,482 | A | | 9/1999 | Shorter |
| 6,131,931 | A | * | 10/2000 | Globerson et al. ..... 280/87.042 |
| 6,641,149 | B2 | * | 11/2003 | Chiappetta et al. ........ 280/87.01 |
| 6,845,991 | B1 | | 1/2005 | Ritucci et al. |
| 6,966,564 | B2 | | 11/2005 | Hernandez, Jr. |
| 2007/0284900 | A1 | * | 12/2007 | Sze ........................ 296/26.15 |

* cited by examiner

*Primary Examiner*—Christopher P Ellis
*Assistant Examiner*—Chiedu A Chibogu
(74) *Attorney, Agent, or Firm*—Dickinson Wright PLLC

(57) ABSTRACT

A foldable wagon assembly movable between an open position and a folded position. A first hinge attaches the center and front sections and a second hinge attaches the center and rear sections. The front wheels are mounted beneath the front section and the rear wheels are mounted beneath the rear section. The distance from the lower surface of the bed to the points of contact of the front and rear wheels is equal to the center section width to establish the folded position (FIG. 9) with the front section and the rear section parallel to one another. The assembly is conveniently and easily convertible between an open position and a folded position making it promptly ready for use, transport, or storage and eliminates transportation and storage problems.

40 Claims, 8 Drawing Sheets

FOLDABLE WAGON

BACKGROUND OF THE INVENTION

1. Field of the Invention

The subject invention relates to a collapsible wagon assembly movable between an open position and a folded position for quick and easy transport and storage.

2. Description of the Prior Art

The use of wagons became popular during the California gold rush to transport people and/or goods. From this large wagon developed a desire for a smaller size wagon used to transport children or smaller loads. Eventually this small wagon even appeared oversized and bulky and a smaller collapsible or foldable wagon arose.

These prior foldable wagons comprise a bed that has an upper surface and a lower surface and has a generally rectangular periphery extending along a longitudinal axis and a front section and a center section and a rear section. A first hinge attaches the front section to the center section and a second hinge attaches the rear section to the center section. A pair of front wheels are mounted to the lower surface beneath the front section with each wheel extending to a radial point of contact for rolling engagement with a surface in the open position. The front wheels are on opposite sides of the longitudinal axis and are both spaced along the longitudinal axis at a front distance from the first hinge. A pair of rear wheels is mounted to the lower surface beneath the rear section with each wheel extending to a radial point of contact for rolling engagement along the surface in the open position. The rear wheels are on opposite sides of the longitudinal axis and spaced along the longitudinal axis at a rear distance from the second hinge. The center section has a width along the longitudinal axis (A) between the first and second hinges for folding the bed from an open position to a folded position.

Three examples of such assemblies are disclosed in U.S. Pat. No. 6,966,564 to Hernandez, Jr. (hereinafter Hernandez), U.S. Pat. No. 5,957,482 to Shorter (hereinafter Shorter) and U.S. Pat. No. 6,845,991 to Ritucci et al (hereinafter Ritucci).

The Hernandez patent discloses an assembly having a generally rectangular periphery extending along a longitudinal axis and includes a front section and a center section and a rear section. A first hinge attaches the front section to the center section and a second hinge attaches the rear section to the center section.

The Shorter patent discloses an assembly having a generally rectangular periphery extending along a longitudinal axis and includes a front section and a rear section attached by a center hinge. A pair of front wheels are mounted to the lower surface with each wheel extending to a radial point of contact for rolling engagement with a surface in the open position. The front wheels are on opposite sides of the longitudinal axis and are both spaced along the longitudinal axis from the center hinge. A pair of rear wheels are mounted to the lower surface with each wheel extending to a radial point of contact for rolling engagement along the surface in the open position. The rear wheels are on opposite sides of the longitudinal axis and spaced along the longitudinal axis from the center hinge.

The Ritucci patent discloses an assembly having a generally rectangular periphery extending along a longitudinal axis and includes a front section and a center section and a rear section. A first hinge attaches the front section to the center section and a second hinge attaches the rear section to the center section. A pair of front wheels are mounted to the lower surface with each wheel extending to a radial point of contact for rolling engagement with a surface in the open position. The front wheels are on opposite sides of the longitudinal axis and are both spaced along the longitudinal axis from the first hinge. A pair of rear wheels are mounted to the lower surface with each wheel extending to a radial point of contact for rolling engagement along the surface in the open position. The rear wheels are on opposite sides of the longitudinal axis and spaced along the longitudinal axis from the second hinge.

Although the prior assemblies are foldable, they remain large and difficult to transport in a car or through small areas. The overall volume occupied by these assemblies make them space consuming and difficult to store. These assemblies fail to be quickly and easily convertible between an open position and a folded position. The prior art assemblies cannot be folded or collapsed to a solid compact position in which the sections may be held against one another.

SUMMARY OF THE INVENTION AND ADVANTAGES

The subject invention provides for a collapsible wagon assembly movable between an open position and a folded position. The assembly includes a rectangular bed that has an upper and a lower surface and a front and center and rear section. A first hinge attaches the center and front sections and a second hinge attaches the center and rear sections. A pair of front wheels is mounted beneath the front section and a pair of rear wheels is mounted beneath the rear section. The assembly is distinguished by the distance from the lower surface to the points of contact of the front and rear wheels being equal to the center section width to establish the folded position with the front section and the rear section parallel to one another as the points of contact of the front wheels engage the lower surface of the rear section at the front distance from the center section and as the points of contact of the rear wheels engage the lower surface of the front section at the rear distance from the center section.

Accordingly, since the center section is equal to the distance between the parallel front and rear sections, as the wheels hold the front and rear sections parallel, the assembly is compact and solid. The folded assembly also forms a rectangular box with parallel opposite sides for convenient storage. The invention also provides an assembly that is smaller and easier to transport in a car or through small areas. The overall volume occupied by this assembly makes it less space consuming and easy to store. Because this assembly is conveniently and easily convertible between an open position and a folded position, it is always promptly ready for use, transport, or storage and eliminates transportation and storage problems.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 8:
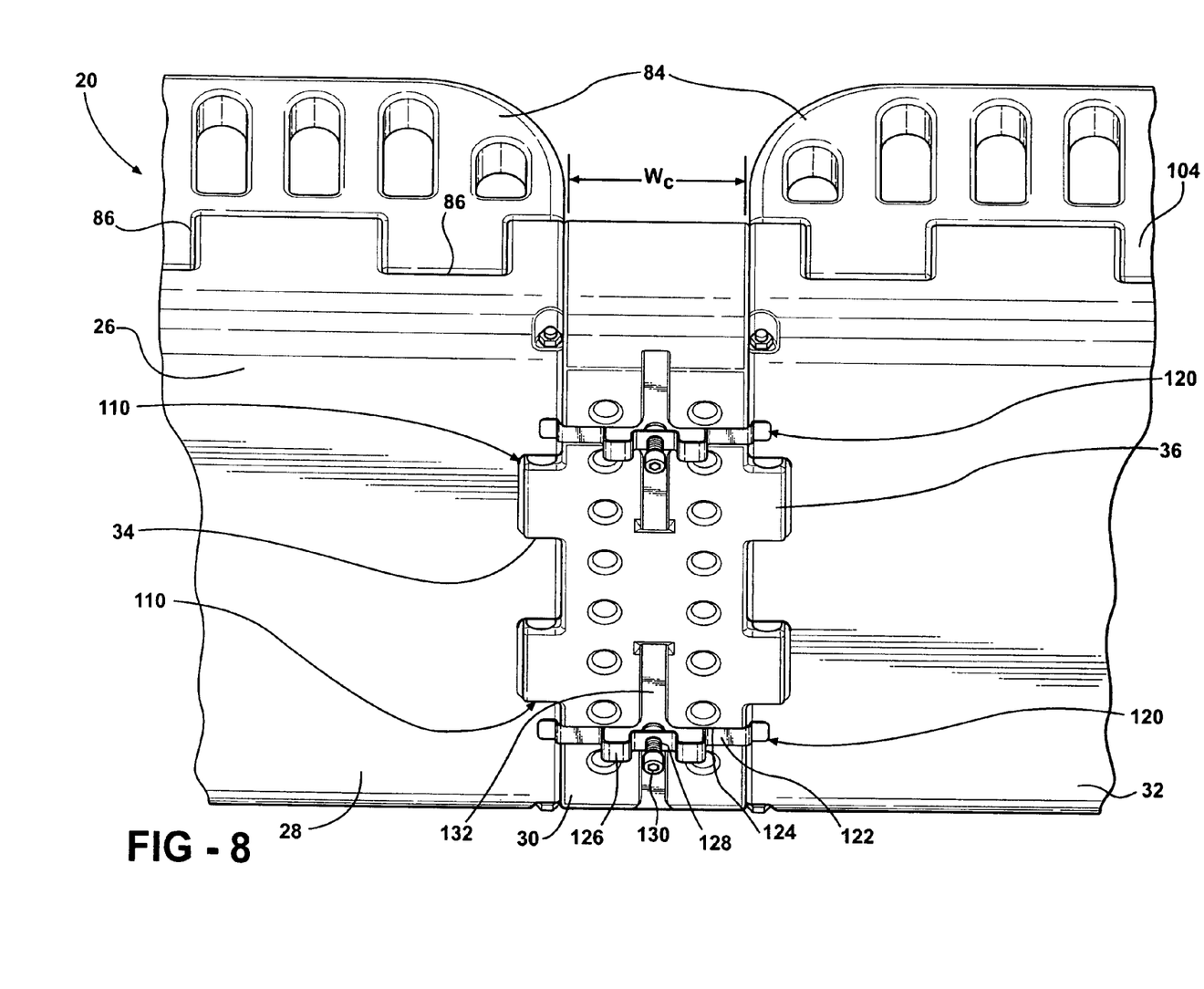
FIG. 8 is a perspective view of a biasing device of the embodiment of FIG. 1.

Referring to the Figures, wherein like numerals indicate corresponding parts throughout the several views, a collapsible wagon assembly 20 is generally shown and is movable between an open position, as shown in FIGS. 1-4, and 8, and a folded position as shown in FIG. 8.

The assembly 20 comprises a bed 22 generally indicated having an upper surface 24 and a lower surface 26 and includes a front section 28 and a center section 30 and a rear section 32. A first hinge 34 attaches the front section 28 to the center section 30. A second hinge 36 attaches the rear section 32 to the center section 30.

The bed 22 has a generally rectangular periphery 38 and extends along a longitudinal axis A perpendicular to the hinges 34, 36. The center section 30 has a width ($w_c$) along the longitudinal axis A between the first and second hinges 34, 36 for folding the bed 22 from the open position to the folded position.

A pair of front wheels 40 is mounted to the lower surface 26 beneath the front section 28 with each wheel extending to a radial point of contact for rolling engagement with a surface in the open position. The front wheels 40 are on opposite sides of the longitudinal axis A and both are spaced along the longitudinal axis A a front distance $X_f$ from the first hinge 34. The points of contact of the front wheels 40 are spaced from one another transverse to the longitudinal axis A at a front wheel distance $Y_f$. A swivel connection 42 connects each of the front wheels 40 to the front section 28 to allow each of the front wheels 40 to swivel about an axis perpendicular to the front section 28 of the bed 22.

A pair of rear wheels 44 is mounted to the lower surface 26 beneath the rear section 32 with each wheel extending to a radial point of contact for rolling engagement along the surface in the open position. The rear wheels 44 are on opposite sides of the longitudinal axis A and spaced along the longitudinal axis A a rear distance $X_r$ from the second hinge 36. The points of contact of the rear wheels 44 are spaced from one another transverse to the longitudinal axis A at a rear wheel distance $Y_r$.

The distance from the lower surface 26 of the bed 22 to the points of contact of the front and rear wheels 40, 44 is equal to the center section width $w_c$ to establish the folded position with the front section 28 and the rear section 32 parallel to one another as the points of contact of the front wheels 40 engage the lower surface 26 of the rear section 32 at the front distance $X_f$ from the first hinge 34 as the points of contact of the rear wheels 44 engage the lower surface 26 of the front section 28 at the rear distance $X_r$ from the second hinge 36.

The points of contact of the front wheels 40 are spaced along the longitudinal axis A from the points of contact of the rear wheels 44 in the folded position. The points of contact of the front wheels 40 are spaced from one another transversely to the longitudinal axis A a different distance than the points of contact of the rear wheels 44 are spaced from one another transversely to the longitudinal axis A in the folded position. The front distance $X_f$ from the first hinge 34 is equal to the rear distance $X_r$ from the second hinge 36 and the front wheel distance $Y_f$ is different than the rear wheel distance $Y_r$ to allow for one of the pair of wheels 40, 44 to be interleaved between the other pair of wheels 40, 44 in the folded position.

An alternative could be that the front wheel distance $Y_f$ is equal to the rear wheel distance $Y_r$ and the front distance $X_f$ from the first hinge 34 is different than the rear distance $X_r$ from the second hinge 36 to space the front wheels 40 from the rear wheels 44 along the longitudinal axis A whereby the points of contact of the front wheels 40 are spaced longitudinally from the points of contact of the rear wheels 44 in the folded position.

The center section 30 of the bed 22 is rectangular between outer edges 46 and between center hinge edges 48. The center section 30 includes center side walls 50 extending perpendicularly upward from the outer edges 46 thereof.

Figure 1:
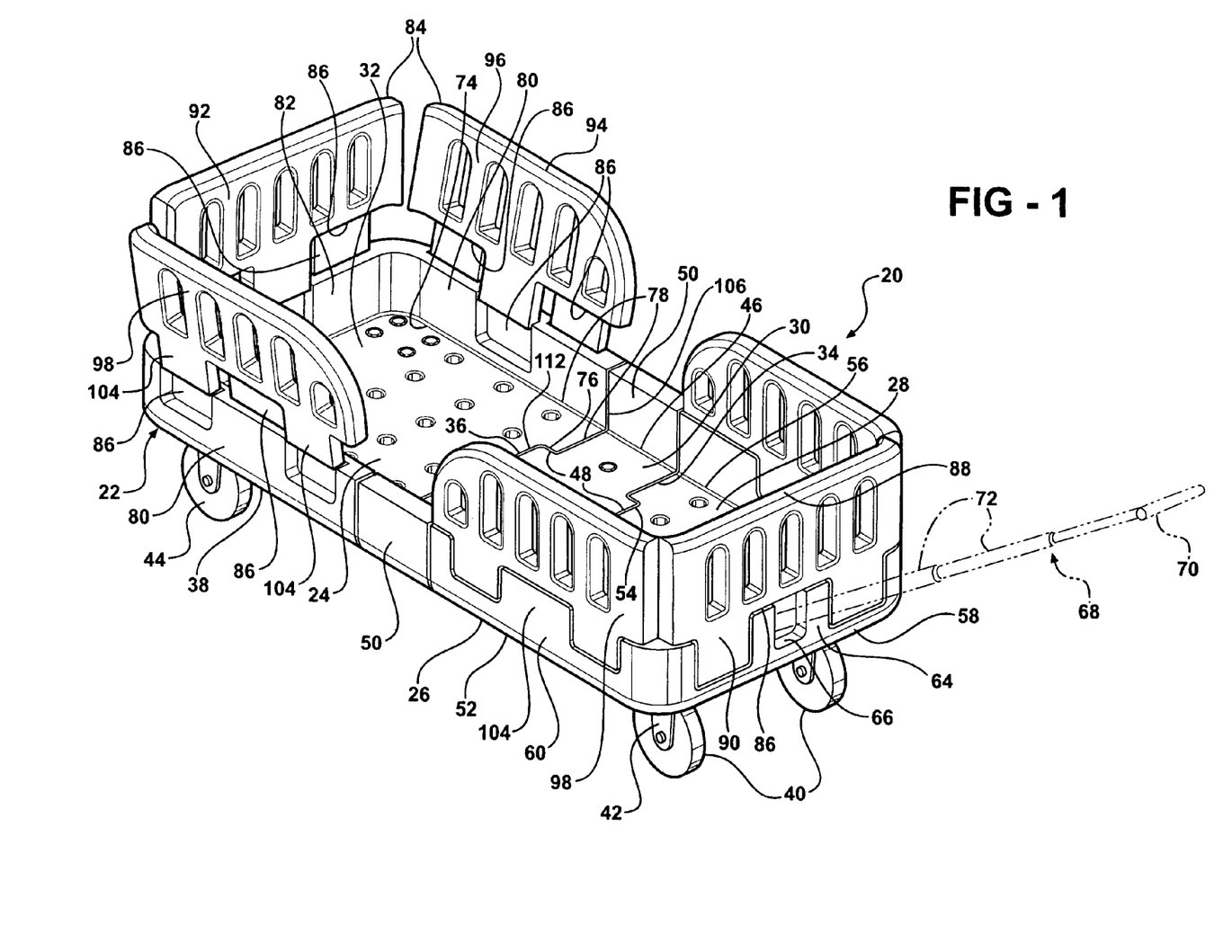
FIG. 1 is a perspective view of an embodiment of the invention in an open position.
Figure 2:
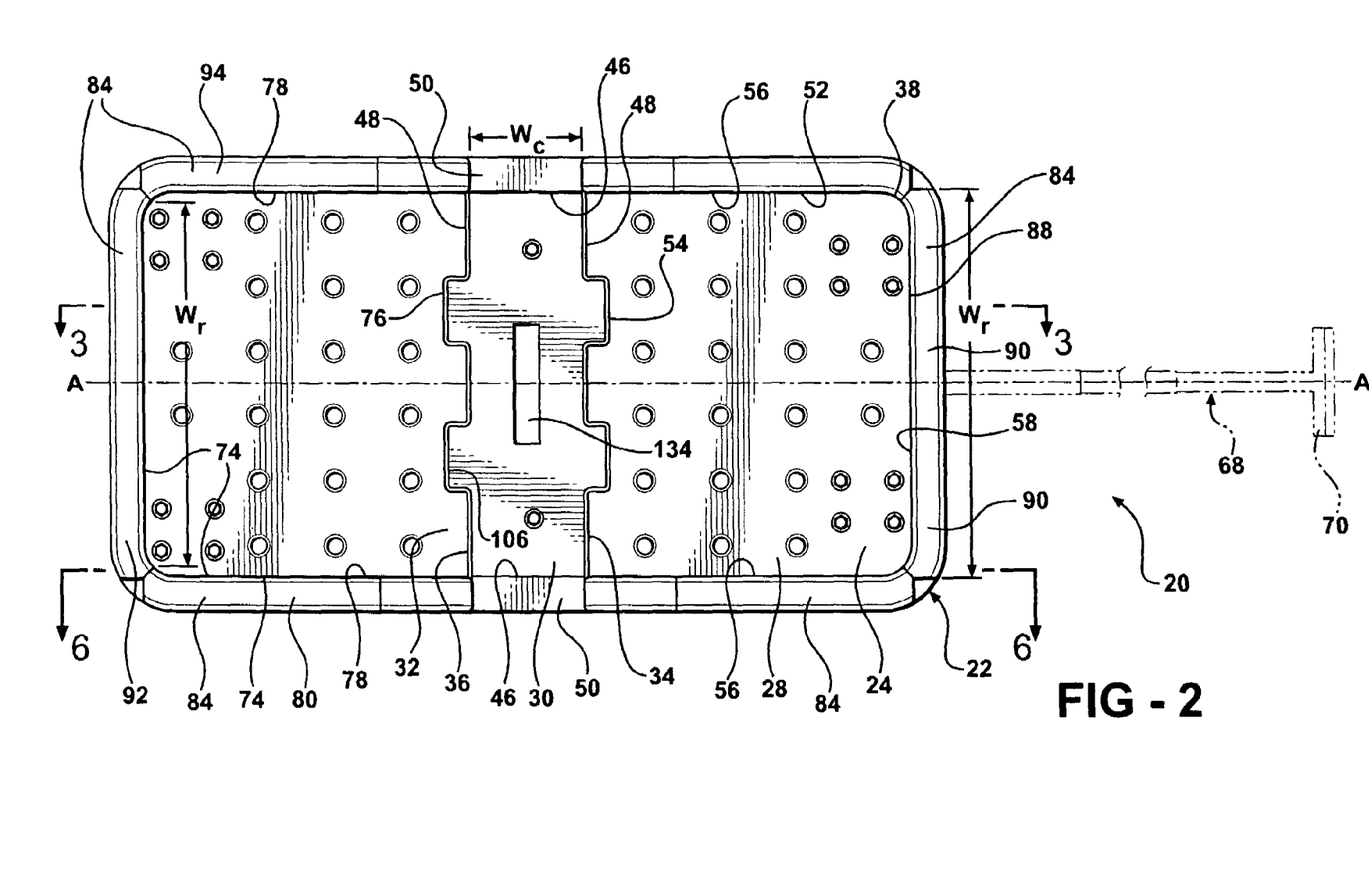
Figure 3:
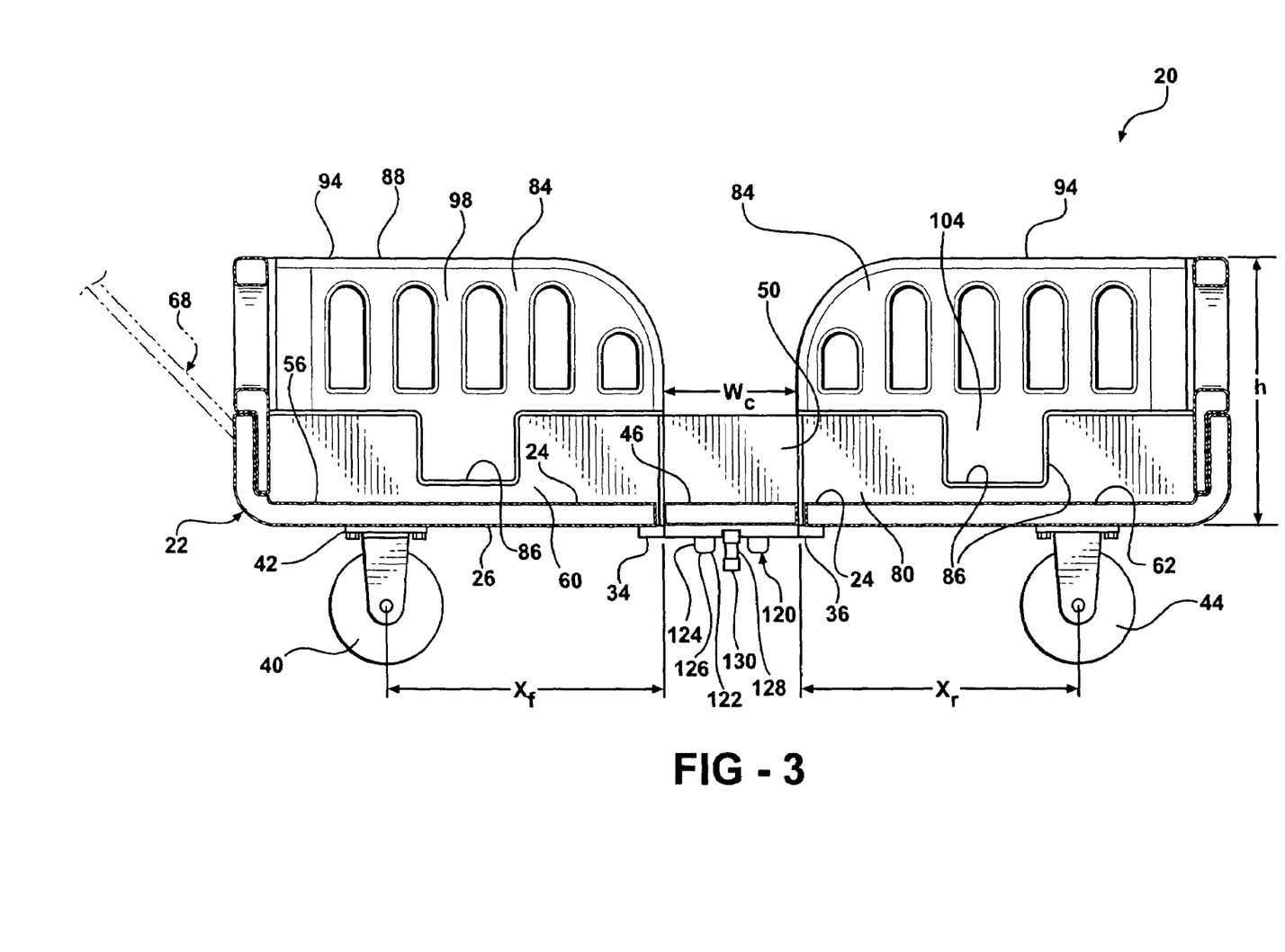
FIG. 3 is a cross sectional view taken along line 3-3 of FIG. 2.
Figure 4:
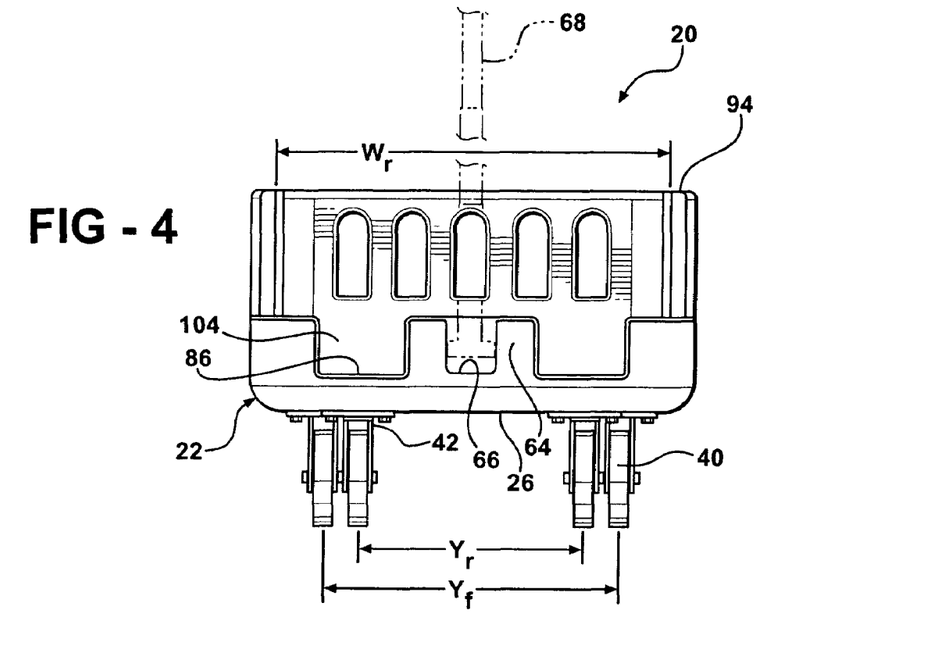
FIG. 4 is a front view of the embodiment of FIG. 1.
Figure 5:
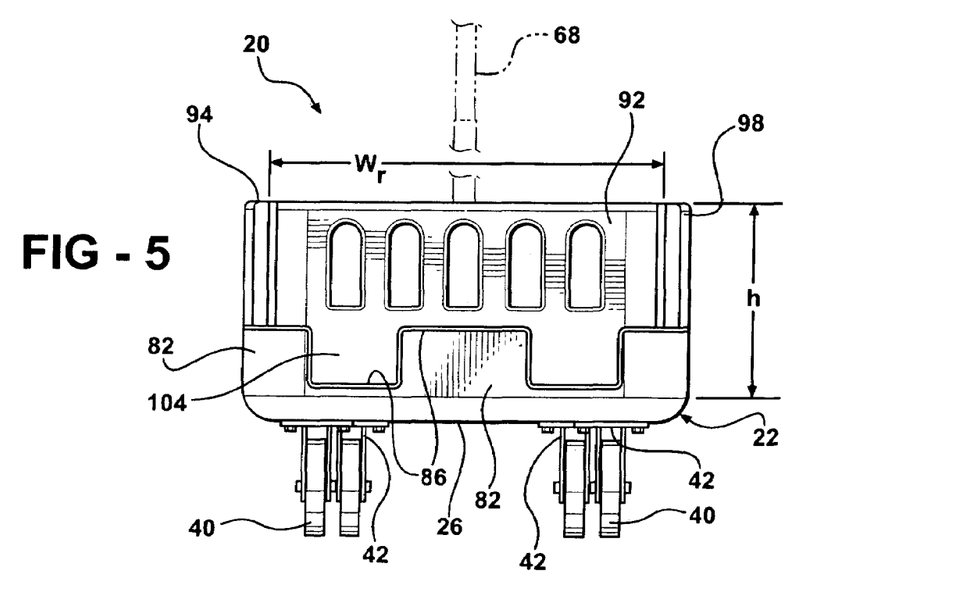
FIG. 5 is a rear view of the embodiment of FIG. 1.

The front section 28 has a front periphery 52 including a front hinge edge 54 and two oppositely disposed front side edges 56 and a handle edge 58 (FIG. 2). The first hinge 34 attaches the front hinge edge 54 of the front section 28 to a first of the center hinge edges 48 of the center section 30. The front section 28 includes front side walls 60 extending perpendicularly upward from the front side edges 58 thereof. The front section 28 includes a notched wall 64 extending perpendicularly upward from the handle edge 58 and defines a rectangular notch 66. A handle 68 (generally shown in phantom) pivotally has one end rotatably connected within the rectangular notch 66 of the front section 28 and extends to a distal handle end 70. The handle 68 includes telescoping portions 72 for extending to an operating position and retractable to a storage position.

The rear section 32 has a rear periphery 74 including a rear hinge edge 76 and two rear side edges 78. The second hinge 36 attaches the rear hinge edge 76 of the rear section 32 to a second of the center hinge edges 48 of the center section 30. The rear section 32 includes rear side walls 80 extending perpendicularly upward from the two rear side edges 62. The rear section 32 includes a rear wall 82 extending perpendicularly upward from the rear edge 78.

Figure 6:
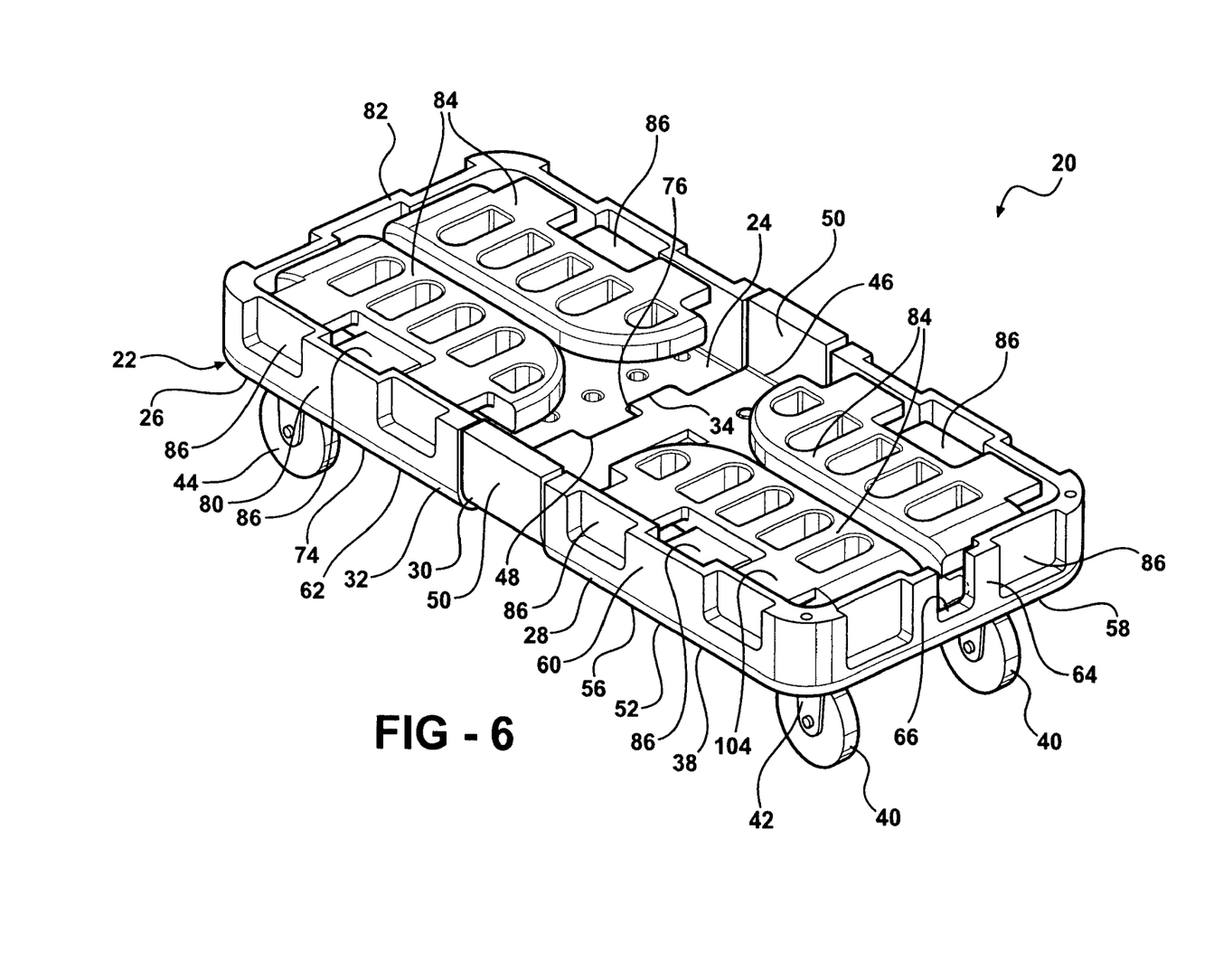
FIG. 6 is a perspective view of the embodiment of FIG. 1 illustrating rails placed inside the bed.
Figure 9:
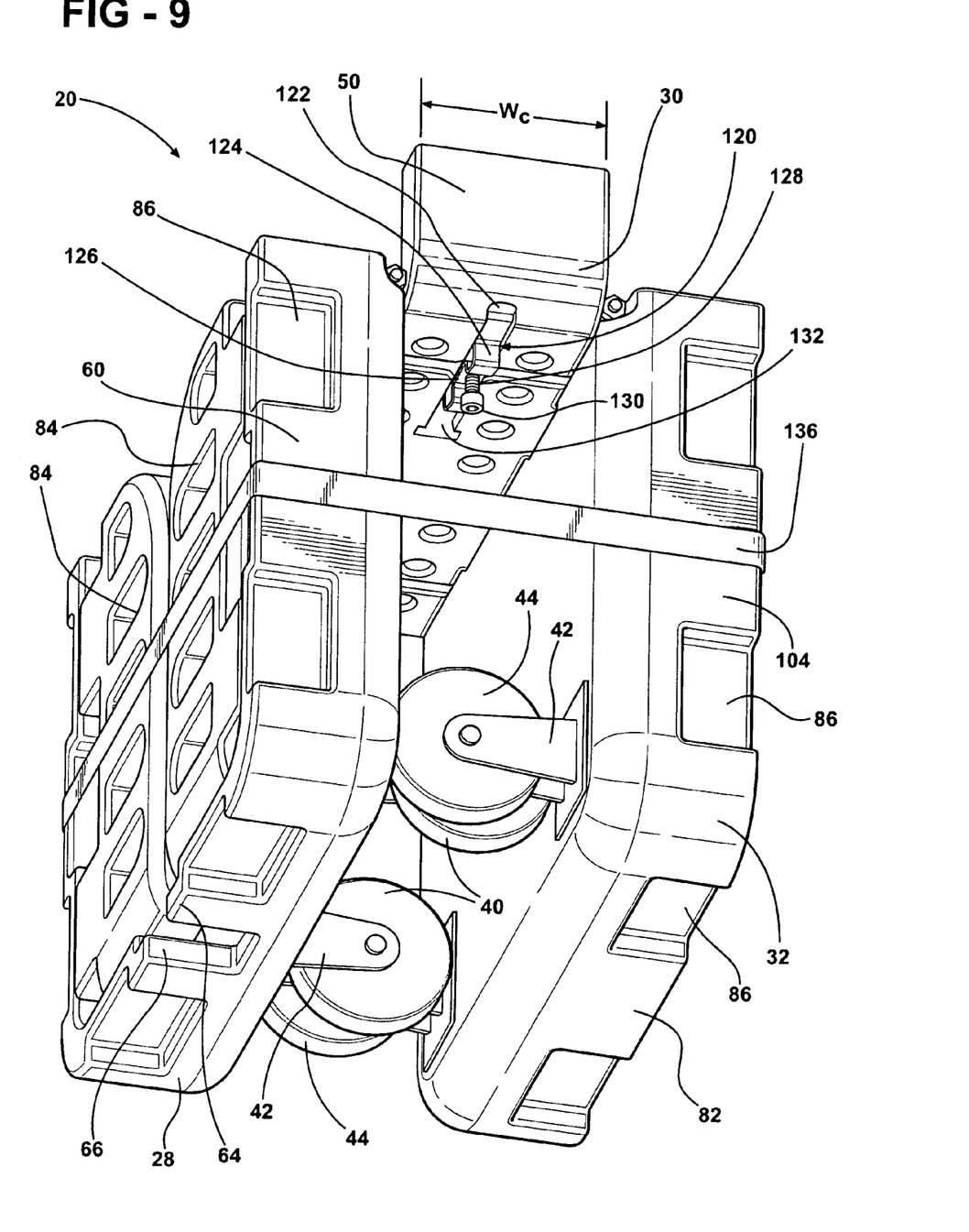
FIG. 9 is a perspective view of the embodiment of FIG. 1 in the fully folded closed position.

A plurality of side rails 84 each have a channel 86 overlapping the front side walls 60 and rear side walls 80 and extend upwardly to define a portion of a retaining barrier 88. A front rail 90 has a channel 86 overlapping the notched wall 64 and extends upwardly to define a portion of a retaining barrier 88. A rear rail 92 has a channel 86 overlapping the rear wall 82 and extends upwardly to define a portion of a retaining barrier 88. The side rails 84 have a height h from the upper surface 24 of the bed 22 to an upper distal rim 94 of the side rail 84 and the height h is less than half the distance between the side edges 56, 78. The front rail 90 has a rail width $w_r$ less than the distance between the front side edges 56. The rear rail 92 has a rail width $w_r$ less than the distance between the rear side edges 78. The side rails 84 are placed flat and abutting one another on top of the front and rear sections 28, 32, overlying the front rail 90 and rear rail 92 and cradled between the periphery 38 of the bed 22, as shown in FIGS. 6 and 9, and also when in the folded position.

The walls 50, 60, 64, 80, 82 each present an interior surface 96 and exterior surface 98, and the exterior surfaces 98 present one exterior channel 86 and the interior surfaces 96 present two interior channels 86 spaced on either side of the exterior channel 86, the channels 86 of each of the rails 84, 90, 92 define two pegs 104 for engaging the interior channels 86 and one peg 104 for engaging the exterior channels 86 of walls 50, 60, 64, 80, 82 for securing the rails 84, 90, 92 on top of the walls 50, 60, 64, 80, 82.

Each of the first and second hinges 34, 36 includes interleaved leaves 106 and a shaft 108 that extends through the leaves 106 for rotating the front section 28 about the first hinge 34 and the rear section 32 about the second hinge 36 to the folded position.

Figure 7:
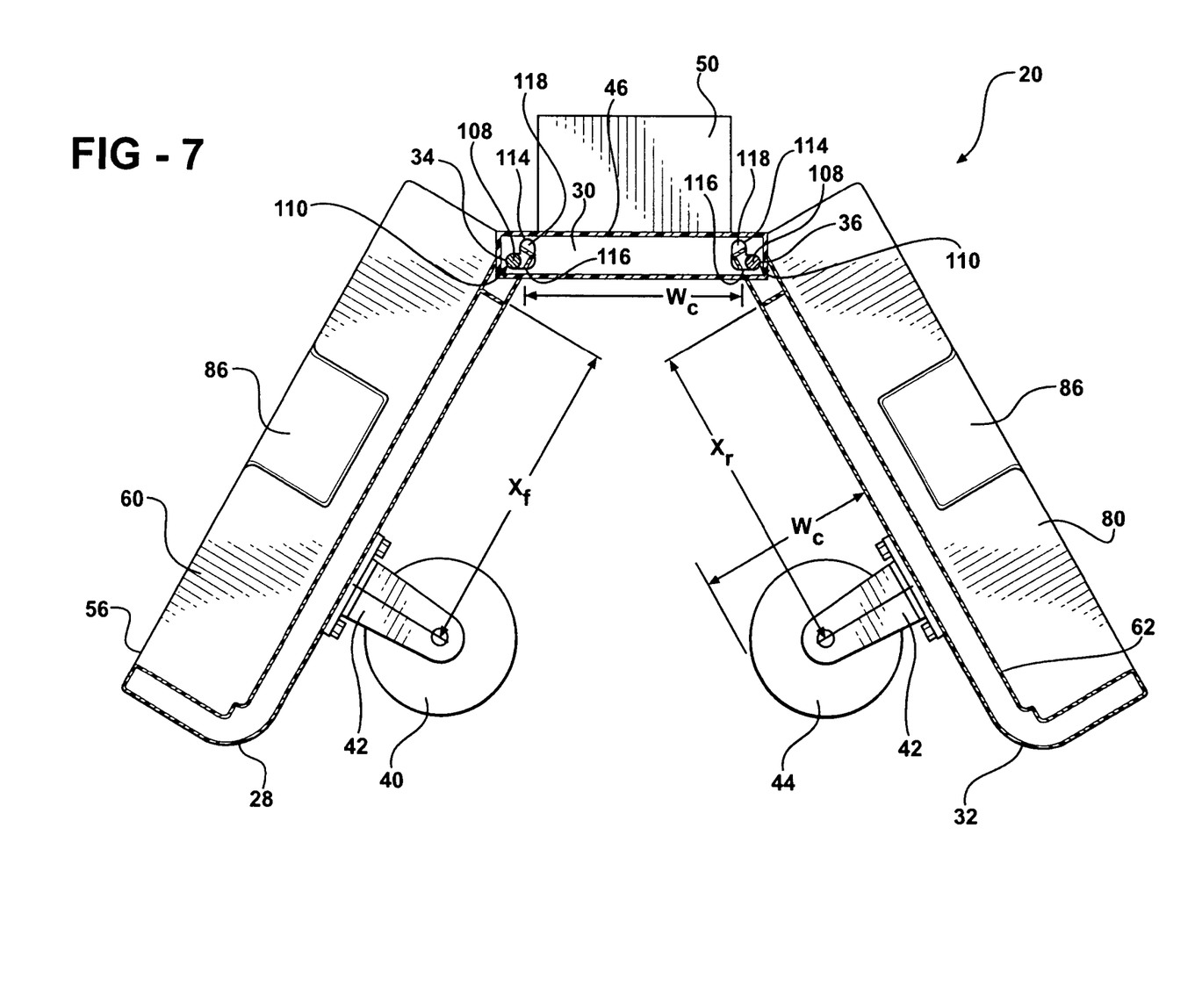
FIG. 7 is a cross sectional view showing a position between the open position and a closed position.

A lock 110 is generally indicated and retains the sections 28, 30, 32 of the bed 22 in one of an open position with the sections 28, 30, 32 aligned with one another and the folded position. The lock 110 includes the leaves 106 of the first and second hinges 34, 36 with center leaves 112 that extend from the center section 30 and define L shaped slots 114 in the center section leaves 112 with each slot having a parallel leg 116 parallel to the center section 30 and a transverse leg 118 transverse to the center section 30 for supporting the shafts 108 for sliding movement in the slots between the open position with the shafts 108 in the parallel legs 116, as shown in FIG. 7, and the sections 28, 30, 32 abutting one another and the folded position with the shafts 108 in the transverse legs 118 and the front and rear sections 28, 32 extending upwardly along the center leaves 112 for preventing rotation about the hinges 34, 36 thereby locking the sections 28, 30, 32 in the folded position.

The lock 110 includes a biasing device 120 generally indicated interconnecting the center section 30 and each of the front and rear sections 28, 32 for biasing the front and rear sections 28, 32 upwardly relative to the center section 30 thereby urging the shafts 108 upward into the transverse legs 118 of the L shaped slots 114 in the open position. The biasing device 120 is movable between one of a biasing position (FIG. 8) and a stored position (FIG. 9) and includes at least one brace 122 having a U shape with the legs 116, 118, 124 engaging the front and rear sections 28, 32 and a center base 126 spaced from the center section 30 in the biasing position. The biasing device 120 includes at least one spring 128 for biasing the front and rear sections 28, 32 upwardly relative to the center section 30 and includes a connection shaft 130 extending from the center section 30 and through the center base 126 of the brace 122 for allowing rotation of the brace 122 between the biasing and stored positions and the spring 128 reacts between the shaft 108 and the brace 122 to bias the brace 122 toward the center section 30. The center section 30 presents a recess 132 disposed in the lower surface 26 transverse to the longitudinal axis A for accepting the biasing device 120 in the stored position.

A carrying device 134 is mounted to the center section 30 for carrying the assembly 20 in the folded position. A strap 136 surrounds the rear section 32, as shown in FIG. 9, and the front section 28 in the folded position and secures the side rails 84 placed flat and abutting one another on top of the front and rear sections 28, 32 cradled between the periphery 38 of the bed 22.

A canopy (not shown) can be mounted on top of the assembly 20 for covering the retaining barrier 88 in the open position. The canopy includes a rectangular cover with four rods each extending downward from the four corners of the cover into slots disposed in the four corners of the bed 22 securing the canopy atop the assembly 20.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "the" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LIST

| Element Symbol | Element Name |
| --- | --- |
| 20 | collapsible wagon assembly |
| 22 | bed |
| 24 | upper surface |
| 26 | lower surface |
| 28 | front section |
| 30 | center section |
| 32 | rear section |
| 34 | first hinge |
| 36 | second hinge |
| 38 | periphery |
| 40 | front wheels |
| 42 | swivel connection |
| 44 | rear wheels |
| 46 | outer edges |
| 48 | center hinge edges |
| 50 | center walls |
| 52 | front periphery |
| 54 | front hinge edge |
| 56 | front side edges |
| 58 | handle edge |
| 60 | front side walls |
| 62 | rear side edges |
| 64 | notched wall |
| 66 | rectangular notch |
| 68 | handle |
| 70 | distal handle end |
| 72 | telescoping portion |
| 74 | rear periphery |
| 76 | rear hinge edge |
| 78 | rear edge |
| 80 | rear side walls |
| 82 | rear wall |
| 84 | plurality of side rails |
| 86 | channel |
| 88 | retaining barrier |
| 90 | front rail |
| 92 | rear rail |
| 94 | upper distal rim |
| 96 | interior |
| 98 | exterior surface |
| 100 | exterior recess |
| 102 | interior recesses |
| 104 | pegs |
| 106 | interleaved leaves |
| 108 | shaft |
| 110 | lock |
| 112 | center leaves |
| 114 | L shaped slots |
| 116 | parallel leg |
| 118 | transverse leg |
| 120 | biasing device |
| 122 | brace |
| 124 | brace legs |
| 126 | center base |
| 128 | spring |
| 130 | connection shaft |
| 132 | recess |
| 134 | carrying device |
| 136 | strap |
| A | longitudinal axis |
| h | height |
| $w_c$ | center section width |
| $w_r$ | rail width |
| $X_f$ | front distance |
| $X_r$ | rear distance |
| $Y_f$ | front wheel distance |
| $Y_r$ | rear wheel distance |

What is claimed is:

1. A collapsible wagon assembly (20) movable between an open position and a folded position comprising;

a bed (22) having an upper surface (24) and a lower surface (26) and including a front section (28) and a center section (30) and a rear section (32), a first hinge (34) attaching said front section (28) to said center section (30), a second hinge (36) attaching said rear section (32) to said center section (30), said bed (22) having a generally rectangular periphery (38) and extending along a longitudinal axis (A) perpendicular to said hinges (34, 36), said center section (30) having a width along said longitudinal axis (A) between said first and second hinges (34, 36) for folding said bed (22) from an open position to a folded position, a pair of front wheels (40) mounted to said lower surface (26) beneath said front section (28) with each wheel extending to a radial point of contact for rolling engagement with a surface in said open position, said front wheels (40) being on opposite sides of said longitudinal axis (A) and both spaced along said longitudinal axis (A) a front distance ($X_f$) from said first hinge (34), a pair of rear wheels (44) mounted to said lower surface (26) beneath said rear section (32) with each wheel extending to a radial point of contact for rolling engagement along the surface in said open position, said rear wheels (44) being on opposite sides of said longitudinal axis (A) and spaced along said longitudinal axis (A) a rear distance ($X_r$) from said second hinge (36), said assembly (20) characterized by the distance from said lower surface (26) to said points of contact of said front and rear wheels (40, 44) being equal to said center section width ($w_c$) to establish said folded position with said front section (28) and said rear section (32) parallel to one another as said points of contact of said front wheels (40) engage said lower surface (26) of said rear section (32) at said front distance ($X_f$) from said center section (30) and as said points of contact of said rear wheels (44) engage said lower surface (26) of said front section (28) at said rear distance ($X_r$) from said center section (30).

2. An assembly (20) as set forth in claim 1 wherein said points of contact of said front wheels (40) are spaced from said points of contact of said rear wheels (44) in said folded position.

3. An assembly (20) as set forth in claim 2 wherein said points of contact of said front wheels (40) are spaced along said longitudinal axis (A) from said points of contact of said rear wheels (44) in said folded position.

4. An assembly (20) as set forth in claim 3 wherein each of said first and second hinges (34, 36) includes interleaved leaves (106) and a shaft (108) extending through said leaves (106) for rotating said front section (28) about said first hinge (34) and said rear section (32) about said second hinge (36) to said folded position.

5. An assembly (20) as set forth in claim 2 wherein said rear distance ($X_r$) from said first hinge (34) is different than said front distance ($X_f$) from said second hinge (36) to space said front wheels (40) along said longitudinal axis (A) from said rear wheels (44) in said folded position.

6. An assembly (20) as set forth in claim 2 wherein said points of contact of said front wheels (40) are spaced from one another transversely to said longitudinal axis (A) a different distance than said points of contact of said rear wheels (44) are spaced from one another transversely to said longitudinal axis (A) in said folded position.

7. An assembly (20) as set forth in claim 6 wherein said points of contact of said front wheels (40) are spaced from one another transverse to said longitudinal axis (A) at a front wheel distance ($Y_f$) and wherein said points of contact of said rear wheels (44) are spaced from one another transverse to said longitudinal axis (A) at a rear wheel distance ($Y_r$).

8. An assembly (20) as set forth in claim 7 wherein said front wheel distance ($Y_f$) is different than said rear wheel distance ($Y_r$).

9. An assembly (20) as set forth in claim 1 including a lock (110) for retaining said sections (28, 30, 32) of said bed (22) in one of said open position with said sections (28, 30, 32) aligned with one another and said folded position with said front section (28) and said rear section (32) parallel to one another.

10. An assembly (20) as set forth in claim 9 wherein said lock (110) includes leaves (106) of said first and second hinges (34, 36) with center leaves (112) extending from said center section (30) and defining L shaped slots (114) in said center section leaves (112) with each slot having a parallel leg (116) parallel to said center section (30) and a transverse leg (118) transverse to said center section (30) for supporting shafts (108) for sliding movement in said slots between said open position with said shafts (108) in said parallel legs (118) and said sections (28, 30, 32) abutting one another and said folded position with said shafts (108) in said transverse legs (116) and said front and rear sections (28, 32) extending upwardly along said center leaves (112) for preventing rotation about said hinges (34, 36) thereby locking said sections (28, 30, 32) in said folded position.

11. An assembly (20) as set forth in claim 10 including a biasing device (120) interconnecting said center section (30) and each of said front and rear sections (28, 32) for biasing said front and rear sections (28, 32) upwardly relative to said center section (30) thereby urging said shafts (108) upward into said transverse legs (118) of said L shaped slots (114) in said open position.

12. An assembly (20) as set forth in claim 11 wherein said biasing device (120) is movable between one of a biasing position and a stored position.

13. An assembly (20) as set forth in claim 11 wherein said biasing device (120) includes at least one brace (122) having a U shape with legs (116, 118, 124) engaging said front and rear sections (28, 32) and a center base (126) spaced from said center section (30) in said biasing position.

14. An assembly (20) as set forth in claim 11 wherein said biasing device (120) includes at least one spring (128) for biasing said front and rear sections (28, 32) upwardly relative to said center section (30).

15. An assembly (20) as set forth in claim 11 wherein said biasing device (120) includes a connection shaft (130) extending from said center section (30) and through a center base (126) of a brace (122) for allowing rotation of said brace (122) between said biasing and stored positions, a spring (128) reacting between said shaft (108) and said brace (122) to bias said brace (122) toward said center section (30).

16. An assembly (20) as set forth in claim 11 wherein said center section (30) presents a recess (132) disposed in said lower surface (26) transverse to said longitudinal axis (A) for accepting said biasing device (120) in said stored position.

17. An assembly (20) as set forth in claim 1 including a plurality of side rails (84) for extending upwardly to define a retaining barrier (88) along said periphery (38) of said bed (22), said side rails (84) having a height (h) from said bed (22) to an upper distal rim (94) of said side rail (84) less than one half the distance between the side edges (56, 78) of said bed (22) for cradling said side rails (84) flat on said bed (22) in said folded position.

18. An assembly (20) as set forth in claim 17 wherein each of said first and second hinges (34, 36) includes interleaved leaves (106) and a shaft (108) extending through said leaves (106) for rotating said front section (28) about said first hinge (34) and said rear section (32) about said second hinge (36) to said folded position, a lock (110) includes said leaves (106) of said first and second hinges (34, 36) with center leaves (112) extending from said center section (30) and defining L shaped slots (114) in said center section leaves (112) with each slot having a parallel leg (116) parallel to said center section (30) and a transverse leg (118) transverse to said center section (30) for supporting said shafts (108) for sliding movement in said slots between said open position with said shafts (108) in said parallel legs (116) and said sections (28, 30, 32) abutting one another and said folded position with said shafts (108) in said transverse legs (118) and said front and rear sections (28, 32) extending upwardly along said center leaves (112) for preventing rotation about said hinges (34, 36) thereby locking said sections (28, 30, 32) in said folded position.

19. An assembly (20) as set forth in claim 18 including a biasing device (120) interconnecting said center section (30) and each of said front and rear sections (28, 32) for biasing said front and rear sections (28, 32) upwardly relative to said center section (30) thereby urging said shafts (108) upward into said transverse legs (118) of said L shaped slots (114) in said open position.

20. An assembly (20) as set forth in claim 19 wherein said biasing device (120) is movable between one of a biasing position and a stored position.

21. An assembly (20) as set forth in claim 19 wherein said biasing device (120) includes at least one brace (122) having a U shape with brace legs (124) engaging said front and rear sections (28, 32) and a center base (126) spaced from said center section (30) in said biasing position.

22. An assembly (20) as set forth in claim 19 wherein said biasing device (120) includes at least one spring (128) for biasing said front and rear sections (28, 32) upwardly relative to said center section (30).

23. An assembly (20) as set forth in claim 19 wherein said biasing device (120) includes a connection shaft (130) extending from said center section (30) and through a center base (126) of a brace (122) for allowing rotation of said brace (122) between said biasing and stored positions, a spring (128) reacting between said shaft (108) and said brace (122) to bias said brace (122) toward said center section (30).

24. An assembly (20) as set forth in claim 19 wherein said center section (30) presents a recess (132) disposed in said lower surface (26) transverse to said longitudinal axis (A) for accepting said biasing device (120) in said stored position.

25. An assembly (20) as set forth in claim 1 including a swivel connection (42) connecting each of said front wheels (40) to said front section (28) to allow each of said front wheels (40) to swivel about an axis perpendicular to said front section (28) of said bed (22).

26. An assembly (20) as set forth in claim 1 including a handle (68) pivotally having one end rotatably connected to said front section (28) and extending to a distal handle end (70).

27. A collapsible wagon assembly (20) movable between an open position and a folded position comprising;
a bed (22) having an upper surface (24) and a lower surface (26) and including a front section (28) and a center section (30) and a rear section (32),
a first hinge (34) attaching said front section (28) to said center section (30),
a second hinge (36) attaching said rear section (32) to said center section (30),
said first and second hinges (34, 36) including center leaves (112) extending from said center section (30),
said first and second hinges (34, 36) includes interleaved leaves (106) and a shaft (108) extending through said leaves (112) for rotating said front section (28) about said first hinge (34) and said rear section (32) about said second hinge (36) to a folded position,
said bed (22) being generally rectangular to extend along a longitudinal axis (A) perpendicular to said hinges (34, 36),
a pair of front wheels (40) mounted to said lower surface (26) beneath said front section (28) for rolling engagement with a surface,
a pair of rear wheels (44) mounted to said lower surface (26) beneath said rear section (32) of said bed (22) for rolling engagement along the surface,
said assembly (20) characterized by a lock (110) including said leaves (106) of said first and second hinges (34, 36) with said center leaves (112) defining L shaped slots (114) in said center section leaves (112) with each slot having a parallel leg (116) parallel to said center section (30) and a transverse leg (118) transverse to said center section (30) for supporting said shafts (108) for sliding movement in said slots between said open position with said shafts (108) in said parallel legs (116) and said sections (28, 30, 32) abutting one another and said folded position with said shafts (108) in said transverse legs (118) and said front and rear sections (28, 32) extending upwardly along said center leaves (112) for preventing rotation about said hinges (34, 36) thereby locking said sections (28, 30, 32) in said folded position.

28. An assembly (20) as set forth in claim 27 including a biasing device (120) interconnecting said center section (30) and each of said front and rear sections (28, 32) for biasing said front and rear sections (28, 32) upwardly relative to said center section (30) thereby urging said shafts (108) upward into said transverse legs (118) of said L shaped slots (114) in said open position.

29. An assembly (20) as set forth in claim 28 wherein said biasing device (120) is movable between one of a biasing position and a stored position.

30. An assembly (20) as set forth in claim 28 wherein said biasing device (120) includes at least one brace (122) having a U shape with legs (116, 118, 124) engaging said front and rear sections (28, 32) and a center base (126) spaced from said center section (30) in said biasing position.

31. An assembly (20) as set forth in claim 28 wherein said biasing device (120) includes at least one spring (128) for biasing said front and rear sections (28, 32) upwardly relative to said center section (30).

32. An assembly (20) as set forth in claim 28 wherein said biasing device (120) includes a connection shaft (130) extending from said center section (30) and through said center base (126) of said brace (122) for allowing rotation of said brace (122) between said biasing and stored positions, a spring (128) reacting between said shaft (108) and said brace (122) to bias said brace (122) toward said center section (30).

33. An assembly (20) as set forth in claim 28 wherein said center section (30) presents a recess (132) disposed in said lower surface (26) transverse to said longitudinal axis (A) for accepting said biasing device (120) in said stored position.

34. A collapsible wagon assembly (20) movable between an open position and a folded position comprising;
a bed (22) having an upper surface (24) and a lower surface (26) and including a front section (28) and a center section (30) and a rear section (32),
a first hinge (34) attaching said front section (28) to said center section (30), a second hinge (36) attaching said rear section (32) to said center section (30), said bed (22) having a generally rectangular periphery (38) and extending along a longitudinal axis (A) perpendicular to said hinges (34, 36), said center section (30) having a width along said longitudinal axis (A) between said first and second hinges (34, 36) for folding said bed (22) from an open position to a folded position, a pair of front wheels (40) mounted to said lower surface (26) beneath said front section (28) with each wheel extending to a radial point of contact for rolling engagement with a surface in said open position, said front wheels (40) being on opposite sides of said longitudinal axis (A) and both spaced along said longitudinal axis (A) a front distance ($X_f$) from said first hinge (34), said front wheels (40) being spaced from one another transverse to said longitudinal axis (A) at a front wheel distance ($Y_f$), a pair of rear wheels (44) mounted to said lower surface (26) beneath said rear section (32) with each wheel extending to a radial point of contact for rolling engagement along the surface in said open position, said rear wheels (44) being on opposite sides of said longitudinal axis (A) and spaced along said longitudinal axis (A) a rear distance ($X_r$) from said second hinge (36), said rear wheels (44) being spaced from one another transverse to said longitudinal axis (A) at a rear wheel distance ($Y_r$), said points of contact of said front wheels (40) are spaced from said points of contact of said rear wheels (44) in said folded position, said front and rear sections (28, 32) parallel to one another as said points of contact of said front wheels (40) engage said lower surface (26) of said rear section (32) at said front distance ($X_f$) from said first hinge (34) and said points of contact of said rear wheels (44) engage lower surface (26) of said front section (28) at said rear distance ($X_r$) from said second hinge (36) in said folded position, a plurality of side rails (84) for extending upwardly to define a retaining barrier (88) along said periphery (38), said side rails (84) having a height (h) from said bed (22) to an upper distal rim (94) of said side rail (84) less than one half the distance between said periphery (38) of said bed (22), said assembly (20) characterized by said folded position wherein a strap (136) surrounds said front and rear sections (28, 32) and secures said side rails (84) placed flat and abutting one another on top of said front and rear sections (28, 32) and cradled between said periphery (38) of said bed (22).

35. A collapsible wagon assembly (20) movable between an open position and a folded position comprising;

a bed (22) having an upper surface (24) and a lower surface (26) and including a front section (28) and a center section (30) and a rear section (32), a first hinge (34) attaching said front section (28) to said center section (30), a second hinge (36) attaching said rear section (32) to said center section (30), said bed (22) having a generally rectangular periphery (38) and extending along a longitudinal axis (A) perpendicular to said hinges (34, 36), said center section (30) having a center section width ($w_c$) along said longitudinal axis (A) between said first and second hinges (34, 36) for folding said bed (22) from an open position to a folded position, a pair of front wheels (40) mounted to said lower surface (26) beneath said front section (28) with each wheel extending to a radial point of contact for rolling engagement with a surface in said open position, said front wheels (40) being on opposite sides of said longitudinal axis (A) and both spaced along said longitudinal axis (A) a front distance ($X_f$) from said first hinge (34), said front wheels (40) being spaced from one another transverse to said longitudinal axis (A) at a front wheel distance ($Y_f$), a swivel connection (42) connecting each of said front wheels (40) to said front section (28) to allow each of said front wheels (40) to swivel about an axis perpendicular to said front section (28) of said bed (22), a pair of rear wheels (44) mounted to said lower surface (26) beneath said rear section (32) with each wheel extending to a radial point of contact for rolling engagement along the surface in said open position, said rear wheels (44) being on opposite sides of said longitudinal axis (A) and spaced along said longitudinal axis (A) a rear distance ($X_r$) from said second hinge (36), said rear wheels (44) being spaced from one another transverse to said longitudinal axis (A) at a rear wheel distance ($Y_r$), said points of contact of said front wheels (40) are spaced from said points of contact of said rear wheels (44) in said folded position, the distance from said lower surface (26) to said points of contact of said front and rear wheels (40, 44) being equal to said center section width ($w_c$) to establish said folded position with said front section (28) and said rear section (32) parallel to one another as said points of contact of said front wheels (40) engage said lower surface (26) of said rear section (32) at said front distance ($X_f$) from said first hinge (34) as said points of contact of said rear wheels (44) engage said lower surface (26) of said front section (28) at said rear distance ($X_r$) from said second hinge (36), said center section (30) of said bed (22) being rectangular between outer edges (46) and between center hinge edges (48), said center section (30) including center walls (50) extending perpendicularly upward from said outer edges (46) thereof, said front section (28) having a front periphery (52) including a front hinge edge (54) and two oppositely disposed front side edges (56) and a handle edge (58), said first hinge (34) attaching said front hinge edge (54) of said front section (28) to a first of said center hinge edges (48) of said center section (30), said front section (28) including front side walls (60) extending perpendicularly upward from said side edges (56, 62) thereof, said front section (28) including a notched wall (64) extending perpendicularly upward from said handle edge (58) and defining a rectangular notch (66), a handle (68) pivotally having one end rotatably connected within said rectangular notch (66) of said front section (28) and extending to a distal handle end (70), said handle (68) including telescoping portions (72) for extending to an operating position and retractable to a storage position, said rear section (32) having a rear periphery (74) including a rear hinge edge (76) and two rear side edges (62) and a rear edge (78), said second hinge (36) attaching said rear hinge edge (76) of said rear section (32) to a second of said center hinge edges (48) of said center section (30), said rear section (32) including rear side walls (80) extending perpendicularly upward from said two rear side edges (62), said rear section (32) including a rear wall (82) extending perpendicularly upward from said rear edge (78), a plurality of side rails (84) each having a channel (86) overlapping said front side walls (60) and rear side walls (80) and extending upwardly to define a retaining barrier (88), a front rail (90) having a channel (86) overlapping said notched wall (64) and extending upwardly to define a retaining barrier (88)

a rear rail (92) having a channel (86) overlapping said rear wall (82) and extending upwardly to define a retaining barrier (88), said side rails (84) having a height (h) from bottom of said channel (86) to upper distal rim (94) of said side rail (84) and said height (h) being less than half the distance between said side edges (56, 62), said front rail (90) having a rail width ($w_r$) less than the distance between said front side edges (56), said rear rail (92) having a rail width ($w_r$) less than the distance between said rear side edges (62), a lock (110) for retaining said sections (28, 30, 32) of said bed (22) in one of an open position and said folded position, a carrying device (134) mounted to said center section (30) for carrying said assembly (20) in said folded position, a strap (136) for surrounding said rear section (32) and said front section (28) to secure said assembly (20) in said folded position, and said strap (136) securing said side rails (84) placed flat and abutting one another on top of said front and rear sections (28, 32) and cradled between said periphery (38) of said bed (22).

36. An assembly (20) as set forth in claim 35 wherein said points of contact of said front wheels (40) are spaced along said longitudinal axis (A) from said points of contact of said rear wheels (44) in said folded position.

37. An assembly (20) as set forth in claim 35 wherein said rear distance ($X_r$) from said first hinge (34) is different than said front distance ($X_f$) from said second hinge (36) to space said front wheels (40) along said longitudinal axis (A) from said rear wheels (44) in said folded position.

38. An assembly (20) as set forth in claim 35 wherein said points of contact of said front wheels (40) are spaced from one another transversely to said longitudinal axis (A) a different distance than said points of contact of said rear wheels (44) are spaced from one another transversely to said longitudinal axis (A) in said folded position.

39. An assembly (20) as set forth in claim 38 wherein said points of contact of said front wheels (40) are spaced from one another transverse to said longitudinal axis (A) at a front wheel distance ($Y_f$) and wherein said points of contact of said rear wheels (44) are spaced from one another transverse to said longitudinal axis (A) at a rear wheel distance ($Y_r$).

40. As assembly (20) as set forth in claim 39 wherein said front wheel distance ($Y_f$) is different than said rear wheel distance ($Y_r$).

* * * * *

UNITED STATES PATENT AND TRADEMARK OFFICE
CERTIFICATE OF CORRECTION

| | | |
|---|---|---|
| PATENT NO. | : 7,523,955 B2 | Page 1 of 1 |
| APPLICATION NO. | : 11/787616 | |
| DATED | : April 28, 2009 | |
| INVENTOR(S) | : Maryann Blair | |

It is certified that error appears in the above-identified patent and that said Letters Patent is hereby corrected as shown below:

Column 2, after line 57: Insert: --FIG. 2 is a top view of the embodiment of FIG. 1;--.

Column 8, line 20: "(118)" should read --(116)--.

Column 8, line 23: "(116)" should read --(118)--.

Signed and Sealed this

Twenty-third Day of June, 2009

JOHN DOLL
*Acting Director of the United States Patent and Trademark Office*